United States Patent [11] 3,624,609

[72] Inventor Gene P. Weckler
Campbell, Calif.
[21] Appl. No. 1,475
[22] Filed Jan. 8, 1970
[45] Patented Nov. 30, 1971
[73] Assignee Fairchild Camera and Instrument Coporation
Syosset, Long Island, N.Y.

[54] TWO-DIMENSIONAL PHOTODIODE MATRIX ARRAY
15 Claims, 10 Drawing Figs.

[52] U.S. Cl. .......... 340/166, 340/147
[51] Int. Cl. .......... H04q 1/00, H04q 3/00, H04q 9/00
[50] Field of Search .......... 340/166

[56] References Cited
UNITED STATES PATENTS

| | | | |
|---|---|---|---|
| 3,286,234 | 11/1966 | Hogrefe | 340/166 |
| 3,414,882 | 12/1968 | Barron | 340/166 |
| 3,465,292 | 9/1969 | Schilling | 340/166 |
| 3,493,932 | 2/1970 | Yu | 340/166 |
| 3,502,802 | 3/1970 | Osborn et al. | 340/166 X |
| 3,519,996 | 7/1970 | Vilkomerson | 340/166 |

*Primary Examiner*—Harold I. Pitts
*Attorneys*—Roger S. Borovoy and Alan H. MacPherson

ABSTRACT: A two-dimensional photodiode array including insulating-gate field-effect transistor switching elements for the photodiodes is described. The photodiodes operate in the photon flux integration mode and means are provided for sequentially scanning the photodiodes in the array. The array is fabricated by metal oxide semiconductor (MOS) techniques or by the more preferred silicon gate fabrication method.

INVENTOR
GENE P. WECKLER

BY Alan H. MacPherson

ATTORNEY

INVENTOR.
GENE P. WECKLER

BY Alan H. MacPherson

ATTORNEY

INVENTOR
GENE P. WECKLER

BY Alan H. MacPherson
ATTORNEY

TWO-DIMENSIONAL PHOTODIODE MATRIX ARRAY

BACKGROUND OF THE INVENTION

There is described in U.S. Pat. No. 3,465,293 titled "Detector Array Controlling MOS Transistor Matrix" issued to Gene P. Weckler on Sept. 2, 1969 a two-dimensional integrated-circuit array comprising a first plurality of photodetector devices arranged in rows and in columns, and a second plurality of metal oxide semiconductor (MOS) transistors arranged in a corresponding number of rows and columns, there being one MOS transistor for each photodetector. The photodetector devices and the MOS transistor are so interconnected and coupled to sampling or scanning means that, when a particular row and a particular column are energized, the MOS transistor at that intersection point provides and AND function to enable sampling of its associated detector.

As stated therein, the photodetectors employed can be either a two-layer structure (i.e., a photodiode) or a three-layer structure (i.e., phototransistor). The phototransistor has an advantage over the photodiode in that the switching function necessary to operate the phototransistor in the photon flux integration or storage mode, a mode of operation used in television cameras, is performed by the emitter base junction of the transistor. The storage mode of operation of photodetectors is described in detail in papers titled "Charge Storage Lights the Way for Solid-State Image Sensors" in Electronics, May 1, 1967 and "Operation of p-n Junction Photodetectors in a Photon Flux Integrating Mode" in the IEEE Journal of Solid State Circuits, Sept., 1967, both authored by G. P. Weckler.

The emitter base junction also provides gain in signal charge proportional to the beta of the transistor structure, a very desirable feature assuming the array of phototransistors has about the same value of beta within ±10 percent and if beta is independent of current, characteristics difficult to obtain in practice. The nonuniformity of gain tends to reduce the dynamic range of the array.

In addition, the built-in voltage of the emitter base junction results in a low-level threshold corresponding to the minimum signal necessary to turn on the emitter base junction, this threshold voltage leading to a lag in the operation of the photodetectors.

BRIEF DESCRIPTION OF THE PRESENT INVENTION

The present invention provides a two-dimensional integrated-circuit array of photodiode sensors which operate in a photon flux integration mode. The array is arranged so that the photodiodes may be electronically interrogated.

The plurality of photodiodes are positioned in rows and columns in the array, and a plurality of insulated-gate field-effect transistors are also positioned in rows and columns in the array, the transistors being coupled to certain ones of said photodiodes to serve as switches for the associated photodiodes.

In one preferred embodiment, the basic cell unit or zone of the array includes four photodiodes and two IG FET switches, the photodiodes being located in different columns and rows, each IG FET switch being coupled to two photodiodes in the same row. By energizing one or the other of the two photodiodes in a particular row by selecting one or the other of the two columns and energizing the associated IG FET switch in that row, the selected photodiode is sampled. The columns of photodiodes may thus be sampled successively row by row.

By the utilization of insulated-gate field-effect transistors as the switching elements in the integrated-circuit array, several advantages are realized over the use of phototransistors. Firstly, fabrication of the array is greatly simplified since only one diffusion step is involved in the manufacture of the IG FET as opposed to the two-step diffusion required for the bipolar transistor. Secondly, the photoresponse in signal charge over the array is more uniform leading to enhanced dynamic range. In addition, the IG FET does not exhibit the low-voltage threshold problem encountered with the bipolar transistor.

As added advantages, if the IG FET is fabricated by use of silicon gate technology, better yields are obtained, speed is increased, and higher packing density results.

These and other features and advantages of the present invention will become more apparent from a perusal of the following specification taken in connection with the accompanying drawings.

BRIEF DESCRIPTION OF PREFERRED EMBODIMENTS OF THE PRESENT INVENTION

Figure 1:
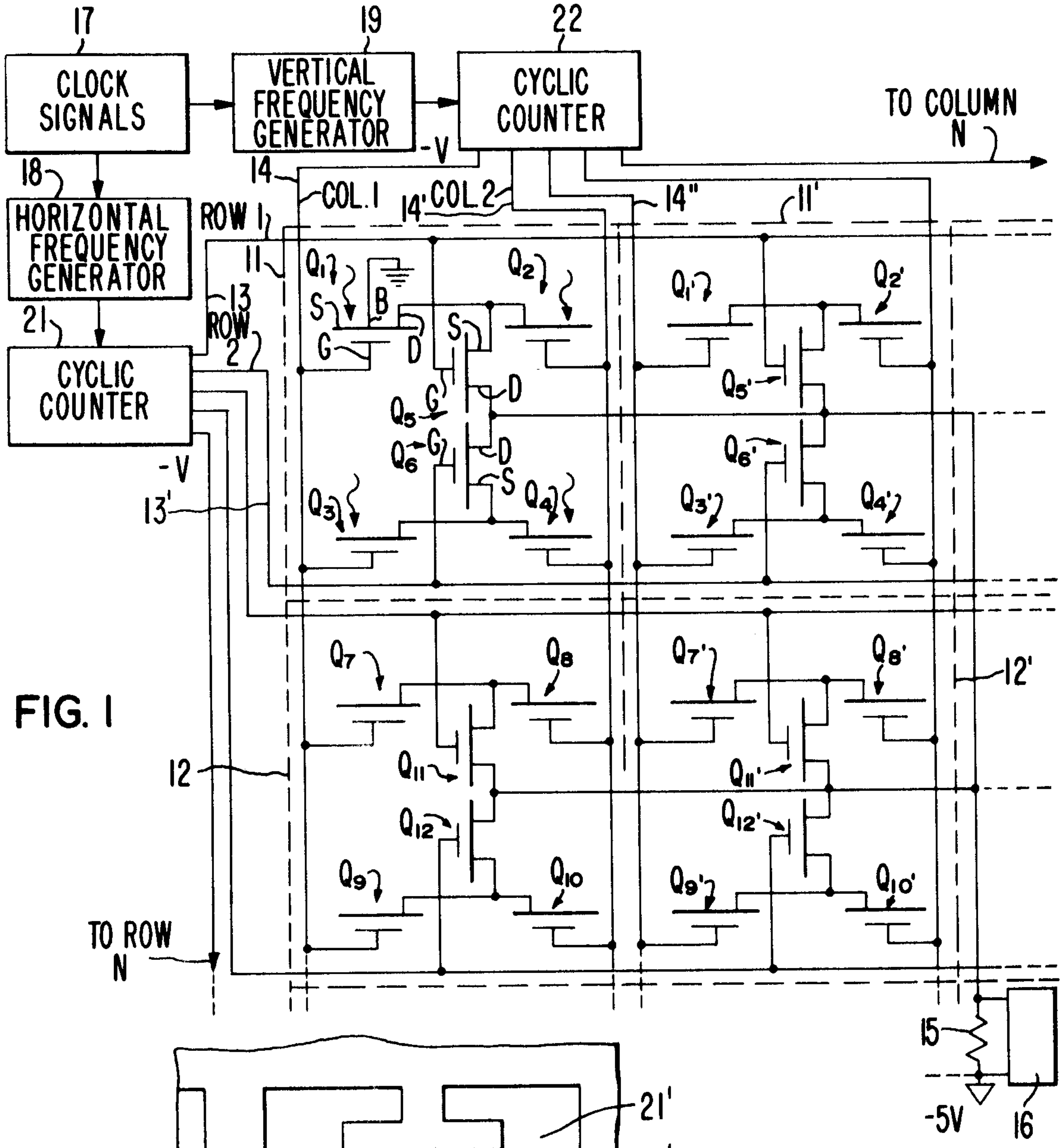
FIG. 1 is a schematic circuit diagram of a photodiode array in accordance with the present invention.

Referring now to FIG. 1 the integrated circuit array comprises a plurality of unit cells or zones 11, 11', 12 and 12', each cell comprising four photodiodes Q1 through Q4, Q1' through Q4', Q7 through Q10, and Q7' through Q10', and two IG FETS Q5 and Q6, Q5' and Q6', Q11 and Q12, and Q11' and Q12', respectively. The photodiodes are arranged in rows and columns, the photodiodes Q1, Q2, Q1', Q2', etc. falling into the first row and photodiodes Q3, Q4, Q3', Q4', etc. falling into the second row, photodiodes Q1, Q3, Q7, Q9, etc. forming the first column and photodiodes Q2, Q4, Q8, Q10, etc. forming the second column.

The IG FETS are also arranged in rows and columns with Q5 and Q5' in row 1, Q6 and Q6' in row 2, etc. and with IG FETS Q5, Q6, Q11, and Q12 in the first column and Q5', Q6', Q11' and Q12' in the second column. Since each IG FET switch is used in conjunction with two associated photodiodes, there are half as many columns of IG FET switches as there are columns of photodiodes in the array.

As indicated with reference to Q1 and Q5, each photodiode comprises a source region S, a gate electrode G, and a drain electrode D and each IG FET switch includes a source electrode S, a gate electrode G and a drain electrode D.

The bulk electrode formed on the back or underside of the wafer and common to all of the photodiodes and IG FET switches is grounded as represented by electrode B shown on photodiode Q1.

A plurality of row buses 13, 13' etc. are provided, row bus 13 being coupled to the gate electrodes of each of the IG FET switches Q5, Q5' etc. in the first row, row bus 13' being connected to each of the gates of the IG FETS Q6, Q6' etc. of the second row, etc.

A plurality of column buses 14, 14', etc. are provided, the first column bus 14, being connected to each of the gates of the photodiodes Q1, Q3, Q7 etc. in the first column, the second column bus 14' being connected to all of the gates of the photodiodes Q2, Q4, Q8, etc. in the second column, the third row bus 14'' being connected to the gates of the photodiodes Q1', Q3' etc. in the third column, etc.

The drains of the two upper photodiodes in each cell, such as Q1 and Q2, are connected in common to the source S of the associated IG FET such as Q5 and the drains of the two lower photodiodes in each cell, such as Q3 and Q4, are connected in common to the source S of the associated IG FET such as Q6. The drain of the two IG FETS Q5 and Q6 are interconnected, the drains of all of the IG FETS being connected in common to the load circuit 15 which is connected to the utilization apparatus 16. It should be noted that, instead of a common load 15, a separate load may be used for each row which is scanned or for each combined photodiode and IG FET switch which is addressed. In utilizing a common load, a train of video signals may be generated analogous to the output of a television camera.

For the purpose of scanning the photodiode array, a source 17 of clock signals is coupled to a horizontal frequency generator 18 and a vertical frequency generator 19. These respective horizontal and vertical frequency generators constitute dividers which divide down the clock signal to a desired horizontal and vertical scanning frequency. The output of the horizontal frequency generator 18 comprises signals for scanning the rows which are applied to a cyclic counter 21. Each output of the counter 21 consisting of a negative pulse is applied to excite the respective row buses 13, 13' etc. The output of the vertical frequency generator 19 is applied to the cyclic counter 22 which serves to distribute the vertical frequency negative pulse signals to the respective column 14, 14' etc. It should be noted that while sequential selection of columns and rows is described, selection may be accomplished in any desired sequence.

Assume now that the array of photodiodes is exposed to a scene for which it is desired to generate video signals. Upon the application of a scanning signal to both the cyclic counters 21 and 22 energizing row bus 13 and column bus 14, current will flow from the source of the photodiode Q1, through the drain thereof and through the source and drain of the IG FET switch Q5 to the load 15. The amplitude of this current will vary with the excitation of the photodetector 15 which in turn varies with the amplitude of the light impinging upon the source thereof as explained in the above articles on storage mode operation of photodiodes. While counter 21 maintains the row bus 13 energized, the cyclic counter 22 energizes the second column bus 14' whereby current flows from the drain of Q2 through the source and drain of Q5 to the load, the value of the current being dependent upon the light intensity upon the source of Q2. Each of the columns in the first row is energized in turn and thereafter the photodiodes in the succeeding rows are scanned in order whereby a sequence of voltage signals are generated across the load circuit 15 representing the scene to which the photodetectors are exposed. The utilization apparatus 16 may be a display device or any other suitable device for processing the video signal wave generated by the array.

Figure 2:
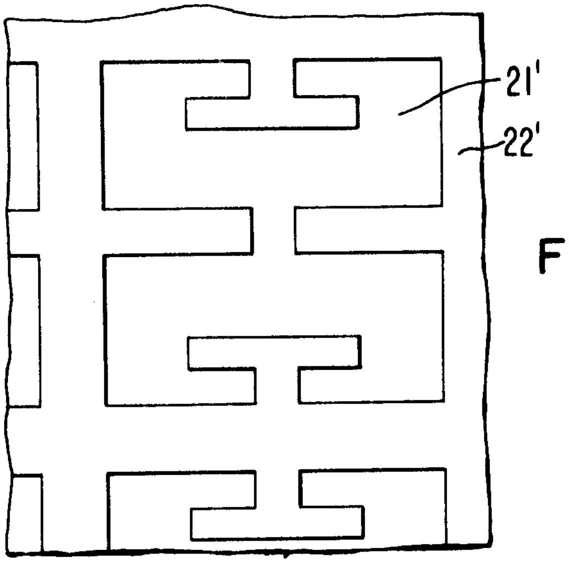
FIGS. 2 and 3 are plan and perspective views, respectively, showing a portion of the surface of the array during an initial stage of fabrication.
Figure 3:
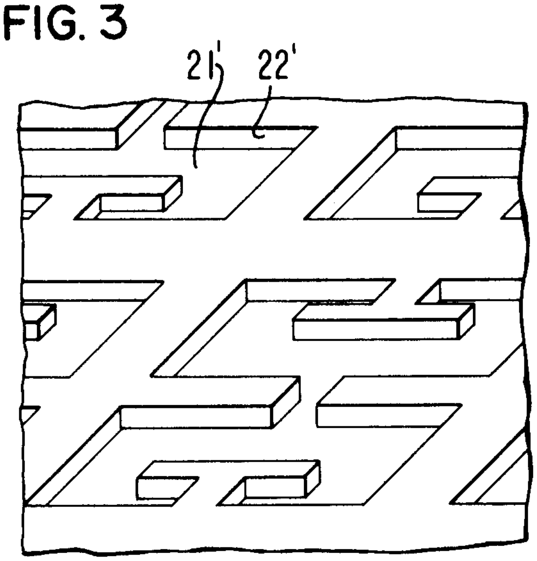

Referring now to FIGS. 2 through 9, there is shown one form of array which may perform the functions described for FIG. 1 above, this array being fabricated utilizing silicon gate technology. As in conventional MOS technology, the starting material is an N-type silicon substrate 21'. The wafer is first placed into an oxidizing atmosphere at high temperature and a relatively thick layer (for example 1 $\mu m$.) of silicon dioxide 22' is formed on the surface thereof. Regions for the source and drain of the four photodiodes and the two IG FET switches in each unit cell are defined by photomasking and the oxide is then etched from this area of the substrate as shown in FIGS. 2 and 3. The wafer is again placed into an oxidizing atmosphere and a thin layer 23 of silicon dioxide (about 0.1 $\mu m$. thick) is formed over the surface.

A thin layer 24 of silicon nitride ($SI_3N_4$), another insulator, may then be deposited onto the entire surface of the wafer. Although this layer is not necessary, it serves to improve the electrical characteristics and the reliability of the array.

At this point a thin layer 25 of polycrystalline silicon is deposited on the wafer and the wafer is then photomasked and etched to remove the silicon and silicon nitride layers except for those areas where the silicon gates are to be positioned and where the silicon layer is intended for use as a circuit interconnection layer.

The wafer is then placed into a diffusion furnace and boron, a P-type impurity that diffuses rapidly into silicon but slowly into silicon nitride or silicon dioxide, is diffused into the surface of the structure. The boron impurities convert the N-type silicon wafer 21', where exposed, and the deposited silicon layer 25 into P-type silicon. During the diffusion, a thin layer 26 of silicon dioxide is formed on the surface.

Figure 4:
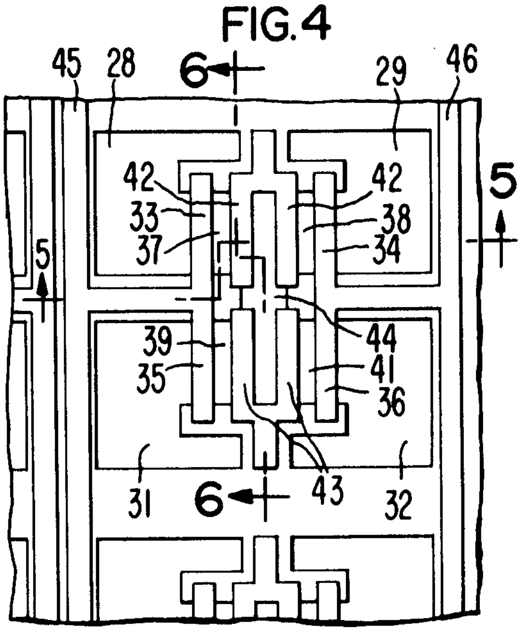
FIG. 4 is a plan view of the array portion after the insulating gates and first interconnecting level have been formed on the array.
Figure 5:
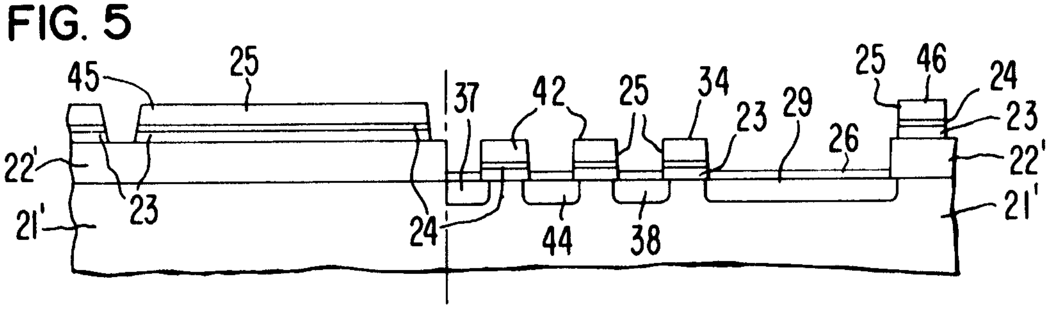
FIGS. 5 and 6 are cross section views of the array of FIG. 4 taken along section lines 5—5 and 6—6, respectively.
Figure 6:
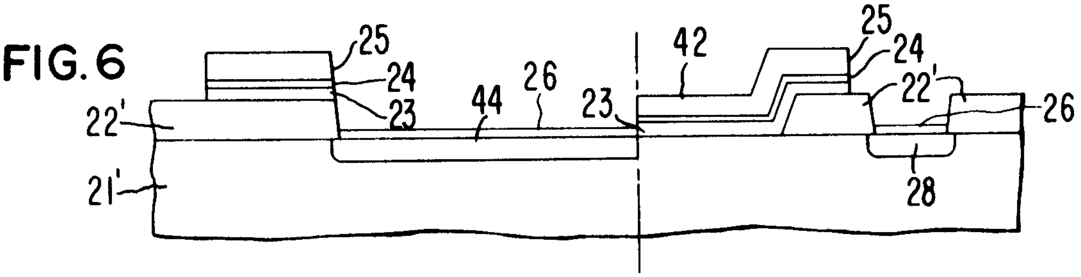
Figure 8:
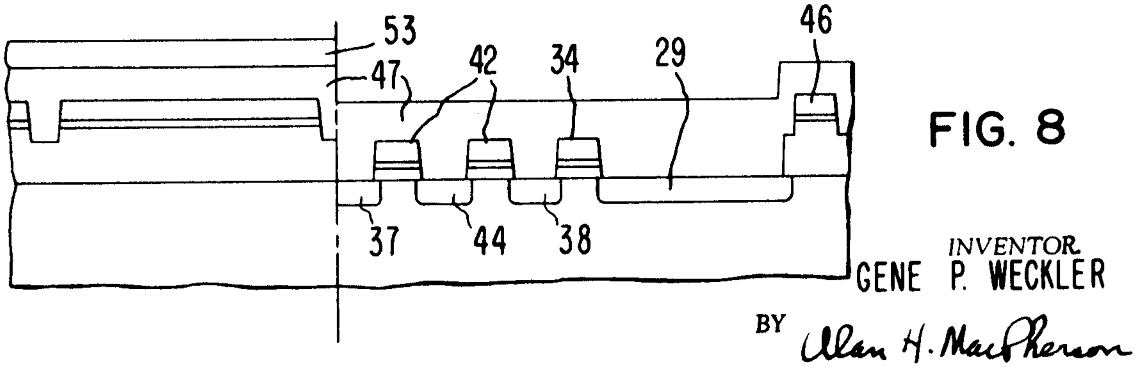
FIGS. 8 and 9 are cross section views of the array of FIG. 7 taken along sections lines 8—8 and 9—9, respectively.
Figure 9:
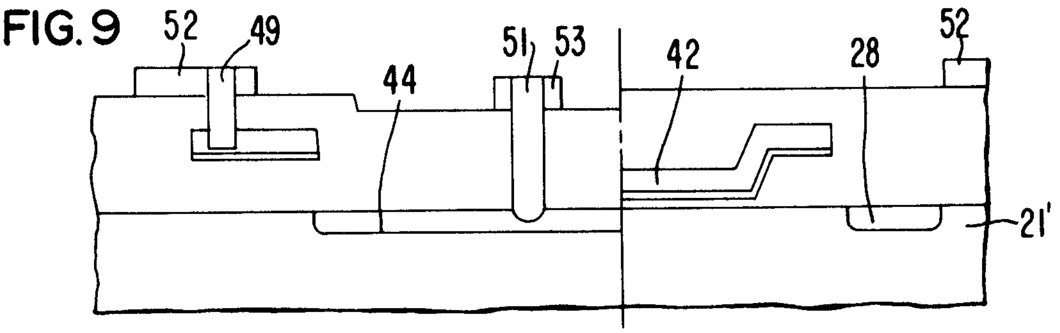

After this step, the array is as shown in FIGS. 4, 5, and 6 including the source regions 28, 29, 31, and 32 the gate regions 33, 34, 35, and 36, and the drain regions 37, 38, 39, and 41 which, for example, form the four photodiodes Q1', Q2', Q3', and Q4', respectively, of zone 11'. The drain regions 37 and 38 also serve as the source region for the IG FET Q5' while the drain regions 39 and 41 serve as the source region for the IG FET Q6'. The gates 42 and 43 for the IG FETS Q5' and Q6' are formed on either side of the common drain region 44.

In addition to forming gates 33, 34, 35, and 36, the P-type silicon layer 25 also serves as the interconnection layers 45 and 46 leading to the associated gates in other unit cells.

A layer of silicon dioxide 47 is then deposited over the entire surface and openings are photoetched in this layer wherever contact between the subsequent metallization layer and an underlying layer is desired. Aluminum is evaporated onto the surface forming a second interconnecting layer and forming contacts 49 and 51 with the underlying interconnecting silicon layer for the gates 42 and 43 and with the drain region 44, respectively (see FIGS. 7, 8, and 9). Photomasking defines the aluminum interconnecting lead 52 connecting the IG FET gates 42 and 43 with associated gates of other zones and interconnecting lead 53 connecting the IG FET drain region 44 with the IG FET drains in other zones.

Figure 7:
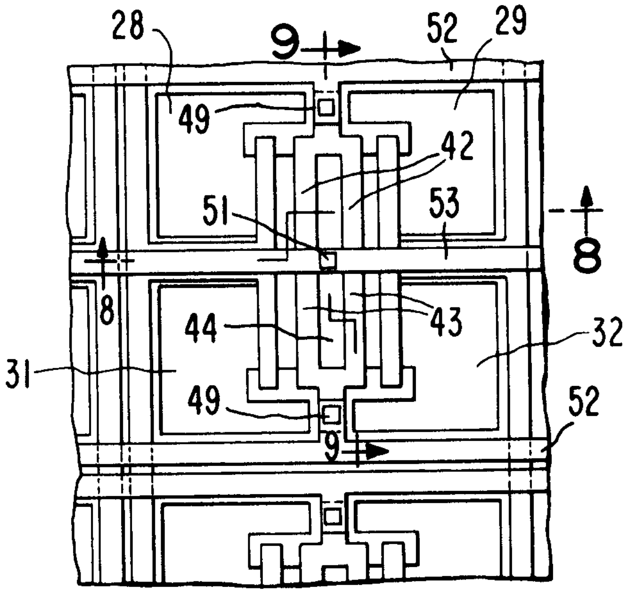
FIG. 7 is a plan view of the array portion after the second interconnecting level and the necessary contacts have been made.

As can be seen in FIG. 7, each unit cell or zone is arranged in roughly four quadrants comprising the four photodiodes, with the first or upper IG FET being positioned between the two upper quadrants, i.e., the first and second quadrants, and the second IG FET being located between the lower or third and forth quadrants.

Figure 10:
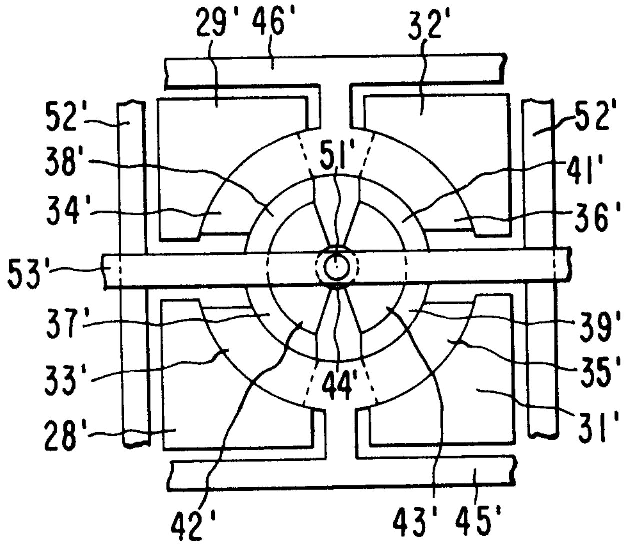
FIG. 10 is a plan view of another form of array embodying the present invention.

Referring to FIG. 10, there is shown a plan view of the unit cell of another form of array which embodies the present invention, This array is made using the metal oxide semiconductor (MOS) or regrown gate technique as distinguished from the silicon gate technique described above with reference to FIGS. 2 through 9. Those elements of the array similar in function to elements in FIGS. 2 through 9 have been given the same reference numerals primed. Since the arrays of this invention may be utilized in a system such as shown in FIG. 1 but with photodiode gates coupled to the row buses 13, 13' etc. and the IG FET switch gates coupled to the column buses 14, 14' etc., the element arrangement of the array of FIG. 10 has been shown rotated 90° relative to the arrangement of the array of FIGS. 2 through 9.

This array comprises the photodiode source regions 28', 29', 31' and 32', insulated gates 33', 34', 35' and 36', and drains 37', 38', 39', and 41. The drain regions 37' and 38' are formed by a unitary, continuous P-diffusion region while the drain regions 39' and 41' are formed by a second continuous P-diffusion region. The drain regions 37' and 38' also serve as the source region for the associated IG FET comprising insulated gate 42' and P-diffusion drain region 44'. The drain regions 39' and 41' also serve as the source region for the other IG FET comprising insulated gate 43' and the common drain region 44'.

The top metal interconnecting layer 53' couples to the connection 51' extending down into the drain region 44'. A lower metal interconnecting layer 52' couples to the gates 42' and 43' while interconnecting layer 45' and 46' couples photodiode gates 33' and 35' and 34' and 36', respectively, to associated photodiode gates in other zones.

The IG FET manufactured in accordance with the silicon gate technology is preferred due to the simpler fabrication technique and to the smaller overall size resulting from this technique.

What is claimed is:

1. An integrated circuit array comprising:

a plurality of photodiodes arranged in rows and columns, said plurality of photodiodes being arranged in groups of four, the photodiodes in each group of four being located in two rows and two columns such that each photodiode is located uniquely at the intersection of one of said two rows and one of said two columns, a multiplicity of insulated-gate field-effect transistor switches arranged in rows and columns, said field-effect transistor switches being arranged in pairs, each pair of switches being located in one column and two rows and being uniquely connected to a corresponding group of four photodiodes such that the first transistor switch in said pair is capable of passing signals generated by the two photodiodes in said group located in one row and the second transistor switch in said pair is capable of passing signals generated by the two photodiodes in said group located in the other row, each row of said field-effect transistor switches corresponding uniquely to one row of said photodiodes;

means for applying energizing potential to any column of said photodiodes to render the photodiodes in said column operative;

means for selectively applying energizing potential to any row of said field-effect transistor switches thereby to energize the photodiode corresponding to the column and the row which are energized; and means, coupled to said switches, for deriving an output from said energized photodiode.

2. Structure as in claim 1 wherein each of said plurality of photodiodes comprises a photosensitive source region, a drain region, a gate electrode overlying but insulated from the semiconductor material between said source region and said drain region and a drain electrode electrically coupled to said drain region.

3. Structure as in claim 2 wherein said gate electrodes in each column of said photodiodes are connected by a common electrode uniquely associated with that column to said means for selectively applying energizing potential to any column.

4. Structure as in claim 3 wherein each of said insulated-gate field-effect transistor switches comprises:

a source region;

a drain region separated from said source region by semiconductor material;

a gate electrode overlying but insulated from the semiconductor material between said source region and said drain region;

a source electrode contacting said source region;

a drain electrode contacting said drain region; and wherein said source electrode of said insulated-gate field-effect transistor switch is connected to the drain electrodes of the two selected photodiodes in the corresponding group of photodiodes in one row.

5. Structure as in claim 4 wherein said gate electrodes in each row of said transistor switches are connected by a common electrode uniquely associated with that row to said means for selectively applying energizing potential to any row.

6. Structure as in claim 5 wherein;

a common electrode connects the drains of each successive pair of field-effect transistor switches in two adjacent rows of said switches to said means for deriving an output from said energized photodiode.

7. An integrated circuit array comprising:

a substrate, a plurality of separate zones on said substrate arranged in spaced-apart rows and columns, each zone comprising four photodevices, each photodevice having a source region and a drain region separated by semiconductor material, a gate electrode overlying but insulated from said semiconductor material and a drain electrode connected to said drain region, and two insulated-gate field-effect transistors, each field-effect transistor having a source region and a drain region separated by semiconductor material, a gate electrode overlying but insulated from said semiconductor material, a source electrode attached to said source region and a drain electrode attached to said drain region, the gates of a first and third of said photodevices being coupled together and the gates of a second and fourth of said photodevices being coupled together, the drains of said first and second photodevices being coupled to the source of a first one of said field-effect transistors, the drains of said third and fourth photodevices being coupled to the source of the second one of said field-effect transistors, the drains of said two field-effect transistors being coupled together, means for interconnecting the gate electrodes of the first and third photodevices in all zones in the same column, means for interconnecting the gate electrodes of the second and fourth photodevices in all zones in the same column, means for interconnecting the gate electrodes of the first field-effect transistors in all the zones in the same row, means for interconnecting the gate electrodes of the second field-effect transistors in all zones in the same row, and contact means for coupling the drain electrodes of all field-effect transistors to an output means.

8. An integrated circuit array as claimed in claim 7 wherein said substrate is silicon and the gates of said switches and said photodiodes comprise heavily doped silicon insulated from said substrate by silicon oxide.

9. An integrated-circuit array comprising a substrate, a plurality of separate zones on said substrate in spaced-apart rows and columns, each zone being arranged in quadrants with a photodiode structure in each quadrant and two insulated-gate field-effect transistor switch structures, a first switch being connected to the photodiodes in a first and second quadrant and the second switch being connected to the photodiodes in a third and a fourth quadrant, the structures in said first and second quadrants and in said third and fourth quadrants each comprising, in series, a diffused source region for one of the photodiodes, an insulated gate for said one photodiode, the insulated gate of the photodiode in the first quadrant being interconnected with the insulated gate of the photodiode in the third quadrant, a diffused region serving as the drain for said one photodiode and a portion of the source for the associated first switch, a first insulated gate structure for the first switch, a diffused region for the drain of the first switch, said drain region being common for both switches, a second insulated gate structure for the second switch interconnected with said first insulated gate structure, a diffused region serving as another portion of the source for the associated first switch and the drain for the other one of the photodiodes, and insulated gate for the other photodiode, the insulated gate of the photodiode in the second quadrant being interconnected with the insulated gate of the photodiode in the fourth quadrant, and a diffused photodiode source region for another one of the photodiodes.

10. An integrated circuit array as claimed in claim 9 wherein said substrate is silicon and the gates of said switches and photodiodes comprise heavily doped silicon insulated from said substrate by silicon dioxide.

11. An integrated circuit array as claimed in claim 9 including means for interconnecting the insulated gates of the photodiodes in the first and third quadrants with the insulated gates of associated photodiodes in the first and third quadrant of certain other zones, means for interconnecting the insulated gates of the photodiodes in the second and fourth quadrants with the insulated gates of associated photodiodes in the second and fourth quadrants of certain other zones, means for interconnecting the gate of said first switch to the gates of associated switches in certain other zones, means for interconnecting the gate of said second switch to the gates of associated switches in certain other zones, and contact means for connecting with the common drain region of the said switches.

12. An integrated-circuit array as claimed in claim 11 wherein said substrate is silicon and the gates of said switches and said photodiodes comprise heavily doped silicon insulated from said substrate by silicon dioxide.

13. An integrated-circuit array comprising a substrate, a plurality of separate zones on said substrate arranged in spaced-apart rows and columns, each zone having two pairs of photodiodes and two insulated-gate field-effect transistor switch structures, one switch being associated with the first pair of photodiodes and the second switch being associated with the second pair of photodiodes each pair of diodes and its associated switch comprising a diffused source region for one of the photodiodes, an insulated gate for said one photodiode, the insulated gate of said one photodiode in the first pair being interconnected with the insulated gate of one photodiode in the second pair, a diffused region serving as the drain for said one photodiode and a portion of the source for the associated switch, an insulated gate for the switch, a diffused region for the drain of the switch, said drain region being common for both switches, a diffused region serving as another portion of the source for the associated switch and the drain for the other one of the photodiodes in said pair, an insulated gate for the other photodiode, the insulated gate of the other photodiode in the first pair being interconnected with the insulated gate of the second photodiode in the second pair, and a diffused photodiode source region for the second one of the photodiodes.

14. An integrated-circuit array as claimed in claim 13 wherein said substrate is silicon and the gates of said switches and photodiodes comprise heavily doped silicon insulated from said substrate by silicon dioxide.

15. An integrated circuit array as claimed in claim 13 including means for interconnecting the insulated gates of said one photodiode in the first and second pair with the insulated gates of associated photodiodes in the first and second pairs of photodiodes of certain other zones, means for interconnecting the insulated gates of said other photodiodes in the first and second pair with the insulated gates of associated photodiodes in the first and second pairs of photodiodes of certain other zones, means for interconnecting the gate of said one switch to the gates of associated switches in certain other zones, means for interconnecting the gate of said second switch to the gates of associated switches in certain other zones, and contact means for connecting with the common drain region of said switches.

* * * * *